United States Patent
San Martin et al.

(10) Patent No.: US 11,294,092 B2
(45) Date of Patent: Apr. 5, 2022

(54) LOW FREQUENCY COMPLEX RESISTIVITY MEASUREMENT IN A FORMATION

(71) Applicant: Halliburton Energy Services, Inc., Houston, TX (US)

(72) Inventors: Luis Emilio San Martin, Albuquerque, NM (US); Glenn Andrew Wilson, Houston, TX (US)

(73) Assignee: Hallburton Energy Services, Inc., Houston, TX (US)

( * ) Notice: Subject to any disclaimer, the term of this patent is extended or adjusted under 35 U.S.C. 154(b) by 73 days.

(21) Appl. No.: 16/494,642

(22) PCT Filed: Dec. 3, 2018

(86) PCT No.: PCT/US2018/063653
§ 371 (c)(1),
(2) Date: Sep. 16, 2019

(87) PCT Pub. No.: WO2020/117202
PCT Pub. Date: Jun. 11, 2020

(65) Prior Publication Data

US 2021/0072420 A1   Mar. 11, 2021

(51) Int. Cl.
*G01V 3/30* (2006.01)
*E21B 49/00* (2006.01)
*E21B 47/12* (2012.01)

(52) U.S. Cl.
CPC ............... *G01V 3/30* (2013.01); *E21B 47/12* (2013.01); *E21B 49/00* (2013.01)

(58) Field of Classification Search
CPC ............ G01V 3/30; E21B 47/12; E21B 49/00
See application file for complete search history.

(56) References Cited

U.S. PATENT DOCUMENTS

| | | | | |
|---|---|---|---|---|
| 4,642,570 A | * | 2/1987 | Sternberg | G01V 3/24 324/366 |
| 7,812,608 B2 | | 10/2010 | Davydychev et al. | |
| 2008/0272789 A1 | * | 11/2008 | San Martin | G01V 3/24 324/355 |
| 2010/0026280 A1 | * | 2/2010 | Davydychev | G01V 3/28 324/202 |

(Continued)

OTHER PUBLICATIONS

Dakhnov, et al., "Well Logging By Means of Induced Polarization (Electrolytic Logging)", The Log Analyst, vol. 8 Nov.-Dec. 1967, 16 pages.

(Continued)

*Primary Examiner* — Christopher P McAndrew
*Assistant Examiner* — Zannatul Ferdous
(74) *Attorney, Agent, or Firm* — DeLizio Peacock

(57) ABSTRACT

A logging tool having a transmitter and receiver is positioned in a geological formation. While the logging tool is static, a transmit input signal is applied to a transmitter to cause the transmitter to induce a transmit output signal in the form of an electromagnetic field into a formation. While the logging tool is static, a formation signal is received based on the transmit output signal. The formation signal may be a voltage indicative of an induced polarization in the formation based on the transmit output signal. A complex resistivity of the formation is determined based on the formation signal.

20 Claims, 9 Drawing Sheets

(56) References Cited

U.S. PATENT DOCUMENTS

| | | | | |
|---|---|---|---|---|
| 2010/0134113 | A1* | 6/2010 | DePavia | G01V 3/28 |
| | | | | 324/346 |
| 2012/0092015 | A1* | 4/2012 | Dashevsky | G01V 3/24 |
| | | | | 324/324 |
| 2013/0106615 | A1* | 5/2013 | Prammer | H04L 25/24 |
| | | | | 340/854.6 |
| 2013/0304384 | A1* | 11/2013 | Rabinovich | E21B 47/14 |
| | | | | 702/6 |
| 2014/0163887 | A1* | 6/2014 | Wu | G01V 3/28 |
| | | | | 702/7 |
| 2016/0187523 | A1 | 6/2016 | Sanmartin et al. | |
| 2017/0197087 | A1* | 7/2017 | Hong | A61N 2/006 |
| 2017/0242146 | A1 | 8/2017 | Itskovich | |

OTHER PUBLICATIONS

Norbisrath, et al., "Complex Resistivity of Spectra and Pore Geometry for Predictions of Reservoir Properties in Carbonate Rocks", Journal of Petroleum Science & Engineering, vol. 151, Mar. 2017, 50 pages.

Olhoeft, "Low-Frequency Electrical Properties", Geophysics, vol. 50 No. 12, Dec. 1985, pp. 2492-2503.

Schmutz, et al., "Influence of Oil Saturation Upon Spectral Induced Polarization of Oil-Bearing Sands", Geophysical Journal International, 2010, pp. 211-224.

Snyder, et al., "Complex Formation Resistivity—The Forgotten Half of the Resistivity Log", Society Of Petrophysicists And Well Log Analysts, 18th Annual Logging Symposium, Jun. 5-8, 1977, 39 pages.

Zhdanov, et al., "Carbonate Reservoir Rocks Show Induced Polarization Effects, Based On Generalized Effective Medium Theory", European Association of Geoscientists & Engineers, 75th EAGE Conference & Exhibition, London, Jun. 10-13, 2013, 5 pages.

PCT Application Serial No. PCT/US2018/063653, International Search Report, dated May 15, 2020, 3 pages.

PCT Application Serial No. PCT/US2018/063653, International Written Opinion, dated May 15, 2020, 6 pages.

* cited by examiner

LOW FREQUENCY COMPLEX RESISTIVITY MEASUREMENT IN A FORMATION

FIELD OF USE

The disclosure generally relates to the field of hydrocarbon evaluation and production, and more particularly to induced polarization (IP) logging in a geological formation to determine a complex resistivity, and in turn, fluid saturation in pores of a geological formation.

BACKGROUND

Understanding the rock and fluid properties of the geological formation surrounding a borehole provides critical information to evaluate and/or monitor hydrocarbon production. Logging via sensors conveyed into a borehole provides valuable information regarding the geological formation characteristics, such as porosity, permeability, and fluid saturations.

BRIEF DESCRIPTION OF THE DRAWINGS

Embodiments of the disclosure may be better understood by referencing the accompanying drawings.

DESCRIPTION

Figure 1:
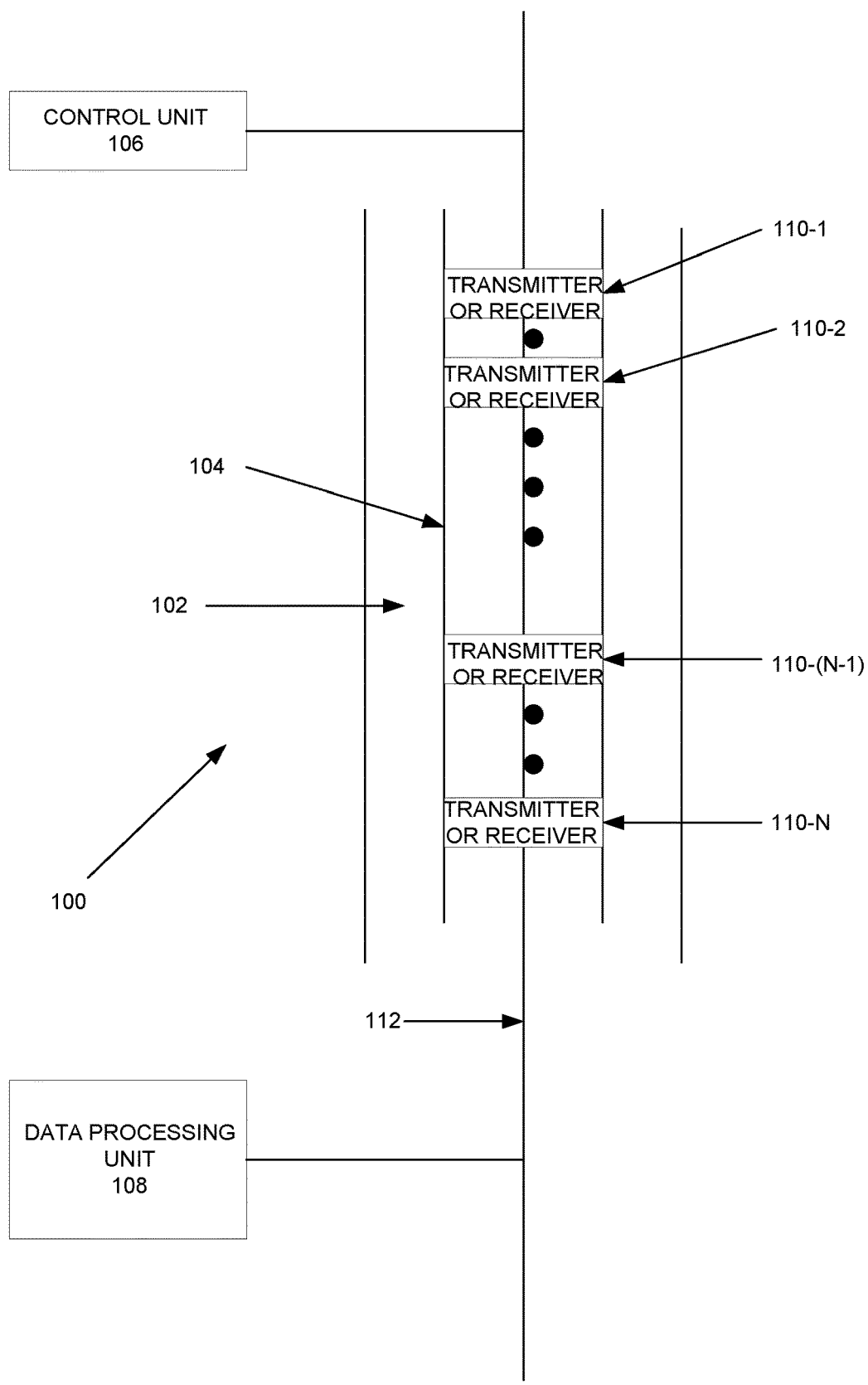
FIG. 1 shows a block diagram of an example tool to make complex resistivity measurements in a geological formation.

Various embodiments relate to logging or measuring characteristics or parameters of a geological formation, and a tool for generating and measuring induced polarization (IP) formation responses in a geological formation. The IP formation response, also referred to as an IP response or effect, manifests as a complex, frequency-dependent resistivity of the formation, and this is indicative of one or more formation parameters of the formation, including fluid saturations of the formation.

In some embodiments, a tool for causing the IP is conveyed into a wellbore of a formation. The tool has one or more transmitters, and one or more receivers. The one or more receivers are located at varying distances from the one or more transmitters. A small distance between a transmitter and receiver allows for determining formation parameters over a small volume of interest at a higher resolution. A large distance between a transmitter and receiver allows for determining formation parameters over a large volume of interest at a lower resolution.

In some embodiments, a transmitter takes the form of one or more transmitter coil antennae, each formed around either a magnetic or non-magnetic core. An input signal, such as an electrical current between 0.01 and 1000 Hz may be applied to the one or more transmitter coil antennae to produce a transmit output signal, which takes the form of an electromagnetic field. The electromagnetic field induces a formation response. A receiver may take the form of one or more coil antennae, each formed around either a magnetic or non-magnetic core, which inductively couples to both the transmit output signal and the formation response. Because the inductive coupling of the formation response to the receiver may be small relative to the transmit output signal (i.e., the primary field from the transmitter), the transmit output signal may need to be cancelled ("bucked") to adequately detect the formation response.

In some embodiments, a receiver has main coils and bucking coils. The main and bucking coils are wound in opposite directions relative to each other, with a large numbers of turns, e.g., 10,000 or more. Such a receiver is arranged to inductively couple the transmit output signal via the main and bucking coil, and cancel the transmit output signal so that the formation response is detected as a signal output by the receiver.

In some embodiments, at least one of the one or more transmitters additionally has a sensing coil wound around the core. The sensing coil measures the electromagnetic field output by the transmitter. An output of the sensing coil is used to normalize the formation signal to account for non-linearities in the transmitter output. Additionally, or alternatively, the formation signal is normalized by the input signal to the transmitter. The normalization by the transmitter current and/or sensing coil waveform may involve deconvolving the input signal from receiver waveforms, so as to normalize the received signals.

In some embodiments, a measurement with a transmitter and receiver involves a logging procedure while the tool is static in a borehole, e.g., not moving during the measurement. By keeping the tool static, the tool allows for obtaining measurements at frequencies below 1 Hz, such as 0.5 Hz. A transmit input signal defined by one or more frequencies can be applied to the transmitter coil of the transmitter and a response of the formation can be detected with the receiver and output as a formation signal.

In some embodiments, one or more transmit input signals is applied to the input of a transmitter. The response of the formation is detected with a receiver as a corresponding formation signal. The logging tool is then moved to another position, e.g., a measured depth in the formation, or remain at a same depth and then another transmit input signal is applied and the responses detected.

Each transmit input signal applied to the transmitter is defined by one or more components such as sinusoidal waves. Additionally, each component may have a frequency. The one or more frequencies of the one or more components may be selected from a group of frequencies such as 20 frequencies in a frequency range from 0.01 Hz to 1000 Hz or 0.05 Hz to 100 Hz to facilitate determination of the formation response at a desired resolution.

The one or more transmit input signals are applied to the transmitter in order to excite the transmitter at the frequencies in the group of frequencies. If a given transmit input signal includes components at all the frequencies in the group of frequencies, then only the given transmit input signal is applied to the transmitter to excite the transmitter at the frequencies in the group of frequencies. If a given transmit input signal includes components at one or a few of the frequencies in the group of frequencies, then a plurality of transmit input signals is applied to the transmitter until the plurality of transmit input signals excites the transmitter at the frequencies in the group of frequencies. In this regard, combinations of transmit input signals, some of which includes the components at one or a few of the frequencies in the group of frequencies and others which include components at many of the frequencies in the group of frequencies are used to excite the transmitter at the frequencies in the group of frequencies.

In some embodiments, an inversion scheme can be used to invert the formation signals from the receiver to determine formation parameters. The formation parameters can include one or more of a porosity, permeability, and fluid saturations in the formation for various depths in the formation. The determination of formation parameters allows for reservoir evaluation assessments, e.g., oil-in-place, or invasion profiles.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example System

Sedimentary rock matrices, such as quartz or carbonates, are generally insulators in the presence of a voltage or current. However, sedimentary rock has fluid-filled pores and/or metallic luster materials, sulfide minerals, clay minerals, graphite, etc. Combined, the rocks and fluids may store or discharge electrical charge, and so act as a dielectric in the presence of the voltage or current.

Induced Polarization (IP) is a surface geophysical survey method for measuring properties of a geological formation such as sulfide minerals. IP can involve introducing a controlled electrical current to the geological formation via one or more electrodes and measuring a resulting voltage as a function of time. An IP effect manifests as a difference in phase and/or amplitude (or frequency-dependence) of the impedance between the applied current and the measured voltage. The difference (or frequency-dependence) is caused by a current-induced, electron-transfer reaction between ions of the fluid and metallic-luster minerals present in the rock. This difference is typically characterized by a complex, frequency-dependence in the bulk electrical resistivity of the rock. For sulfide minerals, empirical relaxation models, such as Cole-Cole relaxation models, have been used to model frequency-dependent resistivity.

The electrical resistivity is a constant of proportionality between the applied electrical current and the measured electric field as defined by Ohm's Law. The electrical resistivity may have a form $r(f)=r'(f)+ir''(f)$ where $r'$ is the real part of the resistivity, $r''$ is a complex component representative of the resistivity, and f is the frequency of the applied current. The complex part of the resistivity $r''$ is zero when the phase of the current and voltage is the same, i.e., there is no IP effect. When an IP effect is present, the complex part of the resistivity $r''$ may be non-zero, and the voltage may continue to be measured for a period of microseconds to as much as several seconds after current is turned off.

Complex resistivity measurements may be performed while drilling or after drilling, and be a measurement indicative of fluid saturation in the formation. In this regard, the measurements may assist in evaluating hydrocarbon reserves and resources. The complexity resistivity may be indicative of presence of hydrocarbons. However, determining high frequency complex resistivity based on high frequency dielectric principles (i.e., from 10 MHz to 1 GHz) is limited, since the complex resistivity can only be determined a few millimeters into a formation.

Embodiments described below are directed to a tool which can be used to determine low frequency complex resistivity of a formation based on induction principles. The geometry of this tool, which has transmitter-receiver spacings in the order of meters and operates between frequencies of 0.01 Hz and 1000 Hz, permit the sensing of a larger (and deeper) volume of interest than high frequency dielectric logging tools, which often have transmitter-receiver spacings in the order of inches and operate between 10 MHz and 1 GHz.

FIG. 1 shows apparatus 100 to determine formation properties down hole in a well 102. The apparatus 100 may include tool 104, control unit 106, and data processing unit 108.

Tool 102 (also referred to as a logging tool) can have an arrangement of transmitters and receivers 110-1, 110-2 . . . 110-(N-1), 110-N structured relative to a longitudinal axis 112 of tool 102. The transmitter can be operated to transmit signals and the receivers can be operated to receive signals. The signals may be transmitted near the tool 104 in regions behind tool 104, regions adjacent to the sides of tool 104, in regions in front of tool 104, and in regions behind the tool 104. A distance between a given transmitter and a given receiver of the tool 104 may vary from as little as 50 cm to much as 20 meters, among other distances.

A control unit 106 may control activation of the transmitters of tool 104 and reception of signals at the receivers of the tool 104. In one example, control unit 106 may be operable to activate a single transmitter to transmit a signal and activate a single receiver to receive the signal. In another example, control unit 106 may be structured to be operable to activate a single transmitter to transmit a signal and activate a plurality of receivers to receive the signal. Further, the control unit 106 may select to activate different pairs of transmitter and receivers in sequence. For example, the control unit 106 may activate a total of four different transmitter/receiver pairs. The transmitter and receiver pairs may be activated in sequence such that only one pair is active at a time. In yet another example, a plurality of transmitter/receiver pairs may be activated at a time. Each transmitter may transmit signals at a given frequency and a receiver may be arranged to receive the transmitted signal at the given frequency.

Control unit 106 may be operated in conjunction with data processing unit 108 which process signals received from the receivers in tool 102. Data processing unit 108 may be structured to be operable to process the signals from the transmitters and receivers to generate complex resistivity measurements of a formation. In turn, the complexity resistivity measurements may be an indication of fluid saturation in the formation which can assist in evaluating hydrocarbon reserves and resources. Components of apparatus 100 can be structured for an implementation in the borehole of a well as a measurements-while-drilling (MWD) system such as a logging-while-drilling (LWD) system. Tool 104 can be located in the bottom hole assembly (BHA). Drilling may stop (e.g., while adding an additional drill pipe stand), and while the tool is stationary, the complex resistivity can be measured. Alternatively, components of apparatus 100 may be configured in a wireline tool configuration. Data processing unit 108 and control unit 106 may be both located downhole, both located on a surface, or one located downhole and the other located on the surface.

Figure 2A:
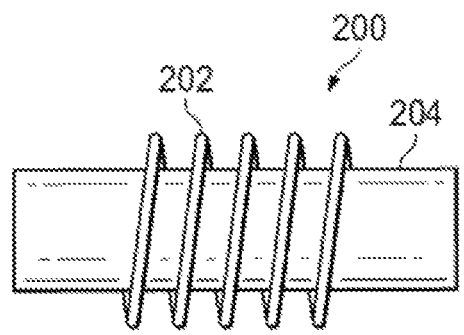
FIGS. 2A, 2B, and 2C show example transmitters of the example tool.
Figure 2B:
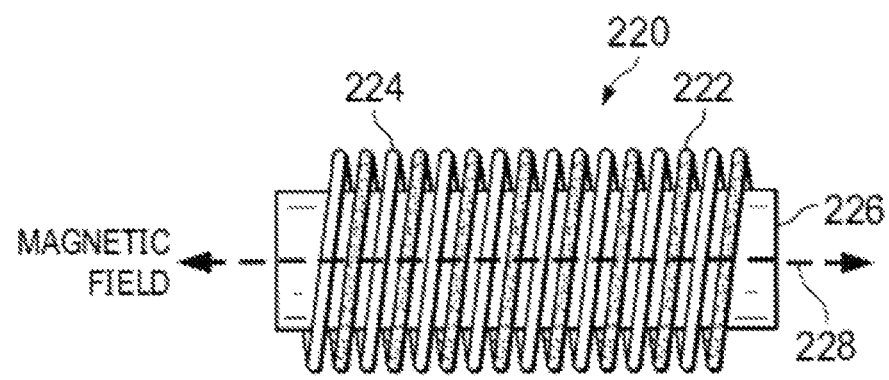
Figure 2C:
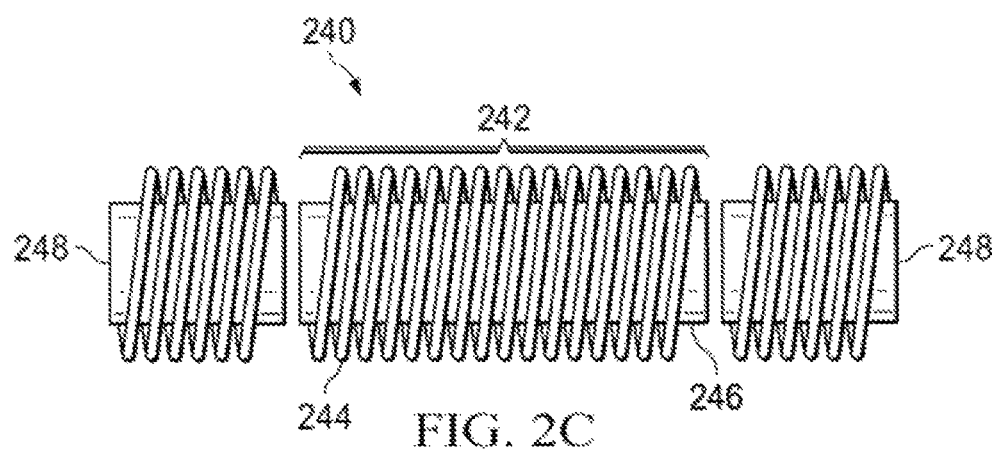

FIGS. 2A, 2B, 2C show example arrangements of the transmitter of the tool. The tool may include a same arrangement of the transmitter or different arrangements of the transmitter.

FIG. 2A shows a transmitter 200 which may take the form a transmitter coil 202 formed around a core 204. The transmitter coil 202 may be a conductive wire such as copper or aluminum and the core 204 may take the form of a magnetic core or non-magnetic core. As shown, the transmitter coil 202 may be formed around the core 204. For example, the transmitter coil 202 may be wrapped around the core 204 with a plurality of turns. In operation, an electrical current may be applied to the transmitter coil 202 which causes the transmitter to transmit a signal. The signal takes the form of an electromagnetic field, and a strength of the transmitted signal is a function of the electrical current applied to the transmitter coil 202 and a number of turns on the transmitter coil 202. Further, use of magnetic core may add additional electromagnetic induction to the transmitted signal, thereby improving a signal to noise ratio of the transmitted signal.

FIG. 2B shows a transmitter 220 which may take the form of a transmitter coil 222 and a sense coil 224 formed around a core 226. The sense coil 224 may be another conductive winding around the core 226 which overlaps with the transmitter coils 222 but is a separate conductive wire from the transmitter coil 222. The sense coil 224 may be used to measure the electromagnetic field output by the transmitter 220 when an electrical current is applied to the transmitter coil 222. The strength may be characterized by a voltage produced across the sense coil 224 when an electrical current is applied to the transmitter coil 222. For example, a larger voltage may indicate a stronger electromagnetic field 228, while a smaller voltage may indicate a weaker electromagnetic field 228. In one or more embodiments, the sense coil 224 does not radiate electromagnetic fields, otherwise those electromagnetic fields will interfere with the electromagnetic fields of the transmitter coil 222. As such, the sense coil 224 is directly connected to a high input impedance amplifier circuit so that the sense coil voltage can be measured while minimizing any induced current in the sense coil 224. In one or more embodiments, the input impedance of the amplifier circuit is greater than 1 MΩ.

FIG. 2C shows a transmitter 240 which may take the form of a sense transmitter coil 242 formed around a core 246, and a sense coil 244 formed around a core 248. The core 248 may be adjacent and separate from the core 246. In one example, the core 246 may be magnetic like the core 248. In another example, the core 246 may be non-magnetic like the core 248. In yet another example, core 246 may be magnetic and core 248 may be non-magnetic, or vice versa. In another example, the core 246 and core 248 may be a single unitary core which is non-magnetic or magnetic rather than two separate cores. The sense transmitter coil 242 and sense coil 244 may operate in a manner similar to that of FIG. 2B. Other variations are also possible.

Figure 3:
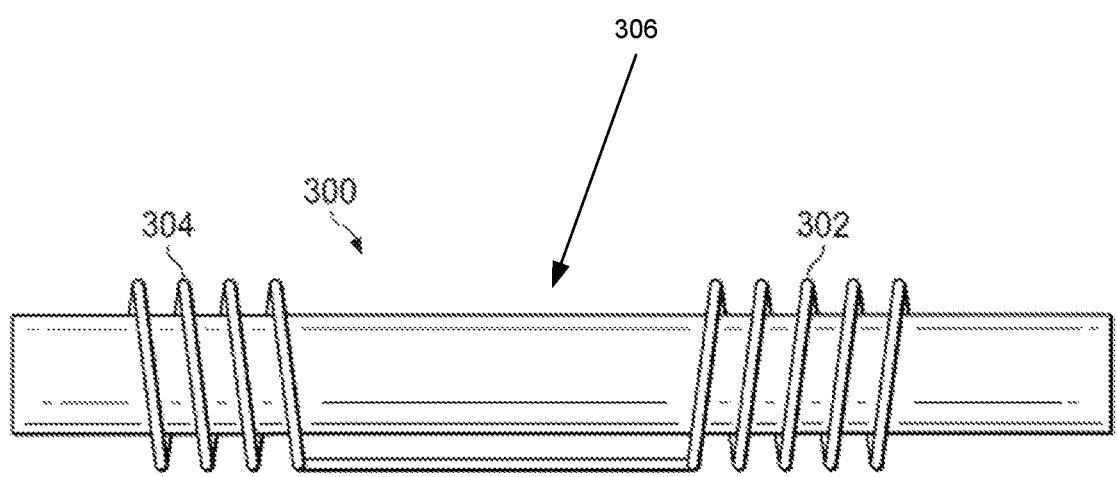
FIG. 3 shows an example receiver of the example tool.

FIG. 3 illustrates an example receiver 300 of the tool. The example receiver 300 may take the form of a main coil 302 and a bucking coil 304 formed around a core 306. Like the transmitter coil, the main coil 302 and the bucking coil 304 may be made of a conductive wire but the core 306 may be non-magnetic rather than magnetic. The main coil 302 and the bucking coil 304 may be wound in different directions. Further, the main coil may have a large number of turns, e.g., in tens of thousands.

The receiver 300 of the tool, including the main coil 302 and bucking coil 304, should not radiate electromagnetic fields, otherwise those electromagnetic fields will interfere with the electromagnetic fields of the other coils. As such, the main coil 302 and bucking coil 304 are each directly connected to high input impedance amplifier circuits so that the main coil 302 and bucking coil 304 voltages can be measured, while minimizing any induced currents in the main coil 302 and bucking coil 304. In one or more embodiments, the input impedance of each of the amplifier circuits should be greater than 1 MΩ.

A voltage may be induced in the example receiver 300 in the presence of an electromagnetic field. For example, the voltage is proportional to the electromagnetic field produced by the transmitter. Both the main coil 302 and the bucking coil 304 receive this electromagnetic field as an induced voltage. However, because the turns of the two coils are opposite and the number of turns and positions are adjusted to cancel the induced voltage when the tool is inside a non-conductive medium, such as air, the induced voltage of each coil cancel each other in air. When the transmitter transmits a signal in a formation, a formation response may be generated. The formation response is an electromagnetic field generated by the formation, separate from the electromagnetic field associated with the transmitter signal. A voltage may be induced in the example receiver 300 in the presence of the formation response which is output by the example receiver 300 as a formation signal. The main coil 302 and bucking coil 304 may not cancel out the formation response like the transmitter signal because the signal of the formation is generated all around the tool and not at the axis of the tool.

A transmitter and receiver pair may be oriented in the tool in different ways. For example, the transmitter and receiver of the pair may be oriented so that an axial direction of each is in a same direction, e.g., both may be oriented vertically or horizontally in the well. In another example, the transmitter and receiver of the pair may be oriented so that the axial direction of each is in different directions, e.g., the transmitter may be oriented vertically and the receiver may be oriented horizontally in the well. The transmitter and receiver of the pair may also be oriented so that the axial direction of each is at an angle ranging between a horizontal and vertical position. The transmitter may be composed of three coils with axis oriented in different directions linearly independent from each other, and the receivers can be composed of three coils with axis oriented in different directions linearly independent of each other, with the receivers separated from the transmitter by a distance. In this case the measure is a nine-component coupling matrix between the nine possible combinations of the three transmitter orientations and the three receiver orientations.

The core of the transmitter and receiver may take other forms as well. Instead of having a single axis as shown in FIGS. 2-3, the core of the transmitter and/or receiver may be configured as having multiple axes.

Figure 4:
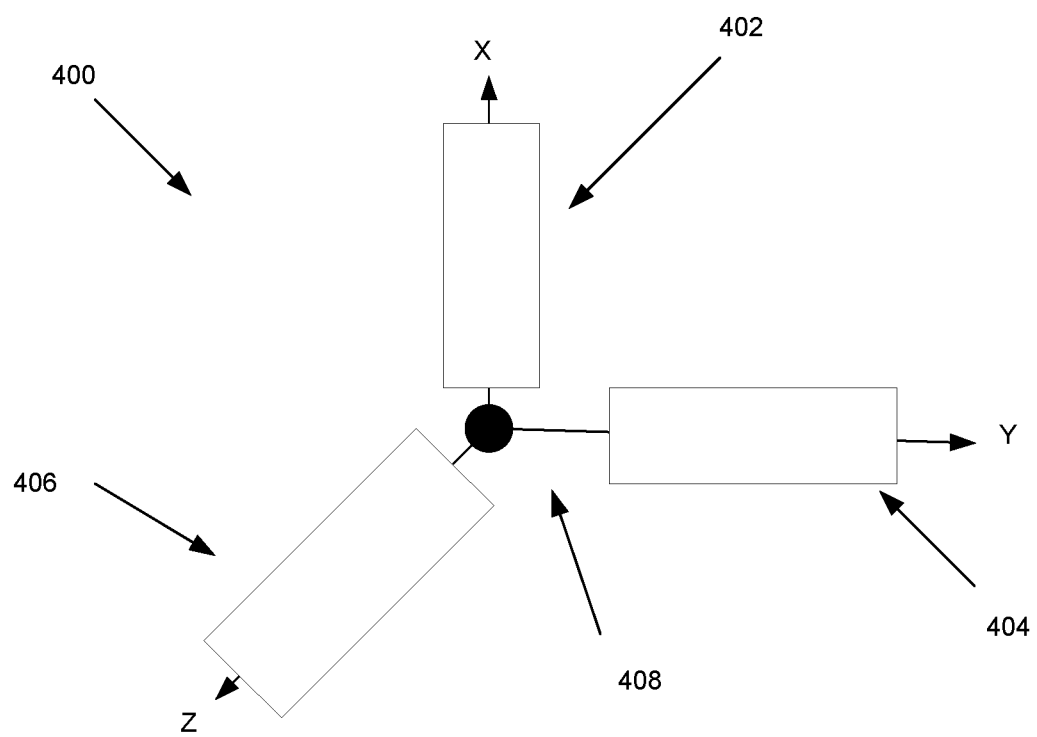
FIG. 4 shows an example multiaxial core for a transmitter or receiver.

FIG. 4 illustrates an example of the multi-axial core 400 in 3-dimensional form. The example multi-axial core 400 may comprise a plurality of single axis cores 402-406 sharing a common origin 408. The multi-axial core 400 may be arranged with a transmitter or receiver coil to form a transmitter or receiver. In the case of the multi-axial core 400 arranged as a transmitter, a transmitter coil and sensing coil may be formed around one or more of axis 402, 404, 406 of the multiaxial core 400 corresponding to X, Y, and Z axes which are orthogonal to each other. In turn, each transmitter coil may be separately driven by a current.

The multi-axial core 400 is shown as a triaxial core with three axis 402, 404, 406. The multi-axial core 400 may have more or less axes, and in the case of less, degenerating to the single axis core shown in FIG. 2 and FIG. 3. In other examples, the multi-axial core 400 may take other shapes including squares, rectangles, circles rather than single axis cores sharing the common origin 408.

Figure 5:
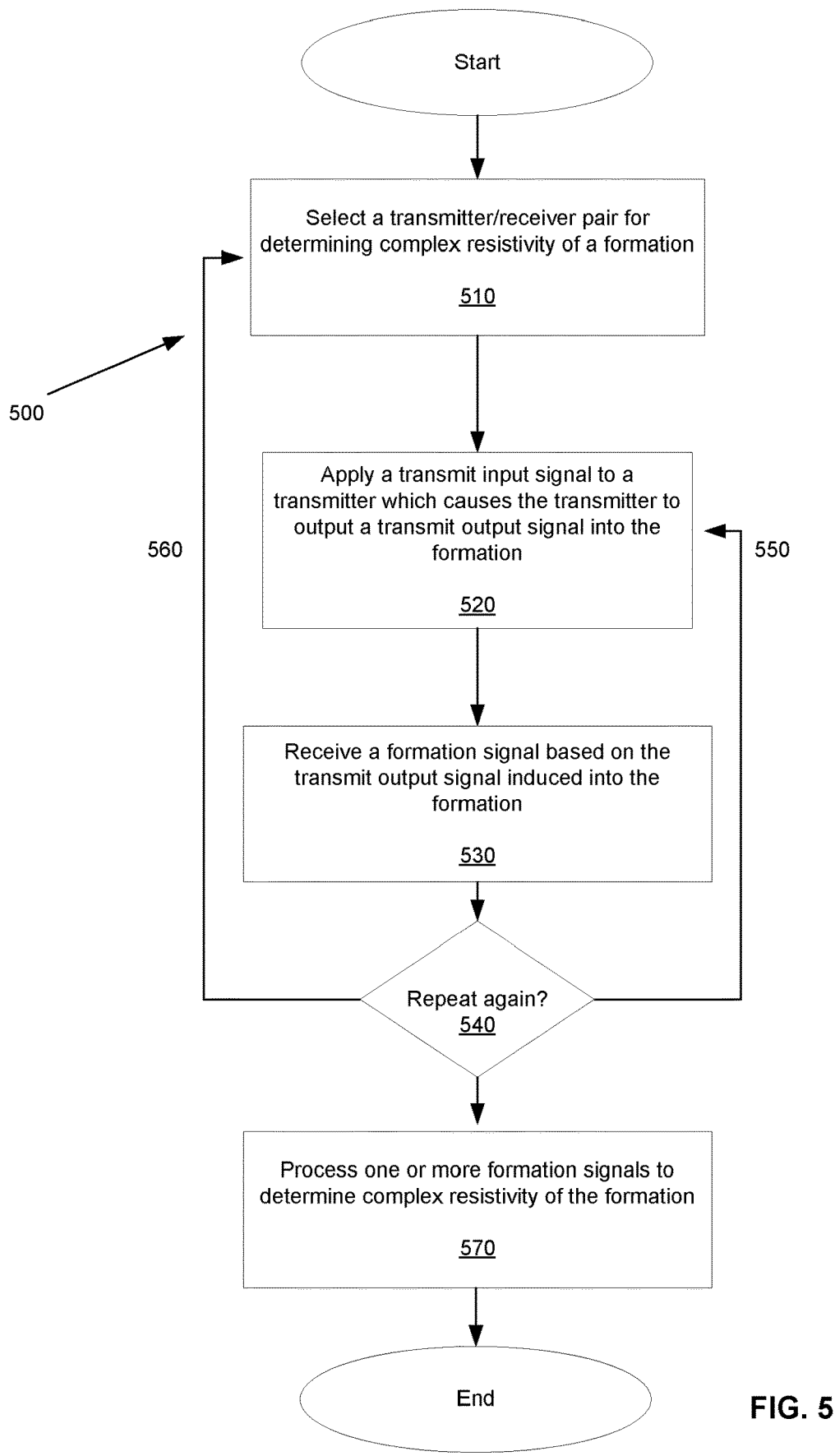
FIG. 5 shows an example process for determining formation characteristics.

FIG. 5 shows an example process 500 for determining complex resistivity in a formation in accordance with the described tool. The process 500 may be performed in accordance with the structure described with respect to FIG. 1.

Briefly, at 510, a transmitter/receiver pair of the tool may be selected for determining complex resistivity of the formation. At 520, a transmit input signal may be applied to the transmitter to cause the transmitter to output a transmit output signal into the formation. At 530, a formation signal may be received based on the transmit output signal output into the formation. The formation signal may be a voltage indicative of an induced polarization in the formation. At 540, a determination is made whether to perform one or more of steps 510 to 530 again via steps 550 and 560. At 570, one or more formation signals are processed. The processing may include determining the fluid saturation of the formation.

Referring back, at 510, a transmitter/receiver pair of the tool may be selected to determine a complex resistivity of the formation. The tool may have an arrangement of spaced apart transmitters and receivers operable in selected transmitter-receiver pairs. Activation of the tool can include selecting a given transmitter-receiver pair. The given transmitter-receiver pair that is selected may depend on a desired area to measure the complex resistivity. For example, selecting a transmitter-receiver pair which is spaced 20 meters apart may result in determining complex resistivity measurements of the formation over an area larger than if the transmitter-receiver pair is spaced 50 cm apart. Further, the distance between the transmitter and receiver may impact a resolution of the complex resistivity measurement. The complex resistivity measurements associated with the 20 meter spacing may be coarser than the complex resistivity measurements associated with the 50 cm spacing. A coarser measurement may mean that there is less number of individual complex resistivity measurements made in a unit area as compared to the resolution if the transmitter and receiver are spaced closer together. In other words, spacing of the transmitter and receiver are directly correlated to vertical resolution of the measurement.

At 520, a transmit input signal may be applied to the transmitter to cause the transmitter to output a transmit output signal into the formation. For example, the transmit input signal applied to the transmitter coil may be a sinusoidal wave such as a current and/or voltage in a frequency range of 0.01 Hz to 1000 Hz or some subset such as 0.05 to 100 Hz. The transmit input signal may include a sinusoidal wave with a single frequency. Alternatively, the transmit input signal may include a plurality of sinusoidal waves with a plurality of frequencies. The transmit output signal induced into the formation may be an electromagnetic field induced by the transmit input signal which varies in accordance with the sinusoidal nature of the transmit input signal.

At 530, a formation signal may be received at the receiver based on the transmit input signal. The receiver may have the main and bucking coil to cancel a direct transmit output signal so that the formation signal is received. The formation signal may be a voltage indicative of induced polarization of the formation due to the electromagnetic field induced by the transmit input signal (e.g., a formation response).

In examples, the transmitter coil of the transmitter may be driven by the sinusoidal wave of the transmit input signal to induce a primary electromagnetic field around the transmitter coil. The primary electromagnetic field may cause eddy currents in the formation to flow in a continuous circular distribution centered around the transmitter. The eddy currents may have a complex component due to ions in pores filled with fluid (e.g., hydrocarbons) and/or metallic luster materials, sulfide minerals, sandstone, graphite, clays, etc. of the formation opposing current flow. The current flow may induce a time varying secondary electromagnetic field. The receiver may receive the primary and secondary electromagnetic field which in turn induces an alternating voltage in the receiver coil. The bucking coil of the receiver may cancel the primary field such that a voltage output by the receiver is an indication primarily of the secondary field, i.e., formation signal. The secondary field may be indicative of the formation response due to IP effects in the formation. The receiver may output an indication of the formation response as a time series of voltages over a period of time.

In examples, steps 520 and 530 may be performed while the tool is stationary so that movement (e.g., noise due to sensor movement in the earth's magnetic field) of the tool does not impact characteristics of the transmit input signal and received formation signal.

At 540, the process of inducing a transmit output signal into the formation and receiving a formation signal may be repeated one or more times. This process may be repeated in a variety of ways until some predetermined criteria is met, e.g., a desired signal to noise ratio or that the transmitter is excited with certain frequencies.

In one example, one or more transmit input signals may be applied to the transmitter coil while the tool is stationary. The stationary tool allows for the receiver to receive the primary and secondary electromagnetic field at low frequencies such as 0.05 Hz. Each transmit input signal may be defined by one or more components such as the sinusoidal waves and each component may have a frequency. The one or more frequencies of the one or more components may be selected from a group of frequencies such as 20 frequencies in a frequency range from 0.01 Hz to 1000 Hz or 0.05 Hz to 100 Hz to facilitate determination of the formation response. One transmit input signal may be applied to the transmitter which results in a corresponding formation signal being received via the receiver. Then, another transmit input signal may be applied and a corresponding formation signal received. This process is illustrated by step 550 where each time path 550 is followed, the transmit input signal is changed.

The one or more transmit input signals are applied to the transmitter in order to excite the transmitter and formation at the frequencies in the group of frequencies. If a given transmit input signal includes components at all the frequencies in the group of frequencies, then only the given transmit input signal may need to be applied to the transmitter to excite the transmitter at the frequencies in the group of frequencies. If a given transmit input signal includes components at one or a few of the frequencies in the group of frequencies, then a plurality of transmit input signals may need to be applied to the transmitter until the plurality of transmit input signals excites the transmitter at the frequencies in the group of frequencies. In this regard, combinations of transmit input signals, some of which includes the components at one or a few of the frequencies in the group of frequencies and others including the components at many of the frequencies in the group of frequencies may be used to excite the transmitter at the frequencies in the group of frequencies.

The number of frequencies associated with a transmit input signal may be chosen to meet signal to noise ratio constraints. The fewer the number of frequencies in the transmit input signal applied to the transmitter coil, the more power may be applied per frequency and the formation signal may have a greater signal to noise ratio. Conversely, the greater the number of frequencies in the transmit input signal applied to the transmitter coil, the less power may be applied per frequency and the formation signal may have a smaller signal to noise ratio.

In another example, the process of the transmitter transmitting a transmit input signal and the receiver measuring a formation response may be repeated for a different combination of transmitters and receivers. The different combination may be physically different transmitters and receivers with different spacing between the transmitter and receiver. As another example, the different combination may be transmitters and receivers with different orientations. To illustrate, a transmitter in a first axis of a multi-axis core may transmit a signal while a receiver in a second axis of a multi-axis core may output a formation signal. The first axis of the multi-axial core of the transmitter may be in a same spatial orientation or different spatial orientation as the second axis of the multi-axial core of the receiver. Then, a different combination of axes of the transmitter and receiver may be used for transmission and reception. In the case that a transmitter has a three-axis core and the receiver has a three-axis core, there may be a total of nine combinations of transmission and reception performed. This process of varying combinations of transmitters and receivers in detecting the formation response is illustrated as step 560 where each time step 560 is followed a different combination of transmitters and receivers are selected. Other variations are also possible.

In yet another example, the tool may be moved after one or more transmit input signals are applied to the transmitter and the receiver outputs one or more corresponding formation signals. The tool may be moved to a next position in the well and a process of applying one or more transmit input signals to the transmitter and the receiver outputting corresponding formation signals may be repeated. The tool may continue to be moved to other positions until an end of a section of a well is reached, among other formation limits. This process is illustrated by step 550 where each time step 550 is followed, the tool could be moved.

In another example, one or more of the transmitters which induces the transmit output signal, the receiver which measures the formation response, the position of the transmitter and receiver, and the frequencies of the transmit input signal may be varied in combination each time the transmit input signal is applied to a transmitter and a formation response is measured by a receiver. For instance, the transmitter may be moved and the frequencies of the transmit input signal may change each time a formation response is measured for the respective transmitter/receiver pair. Additionally, or alternatively, the transmitter and receiver spacing may change and the frequencies of the transmit input signal may change each time a formation response is measured for the respective transmitter/receiver pair. Other arrangements are also possible.

At 570, the one or more formation signals may be processed to determine a complex resistivity of the formation. The formation signals may be processed after the predetermined criteria is met such as the tool reaching an end of a section of a wellbore. The formation signals may be a time series values of varying frequency with real and imaginary components. The real component may identify an in-phase component of the formation signal with reference to a sinusoidal wave while the imaginary component may identify a phase of an out of phase component of the formation signal with reference to a sinusoidal wave. The processing may involve one or more functions.

The processing may involve filtering the formation signals to remove noise in the formation response. Additionally, or alternatively, the formation signals received at the receiver at different depths may be corrected for temperature. The temperature of the formation may vary with depth and affect a measured signal. The formation signals received at different depths may be adjusted for this temperature so that the formation signals received at different depths are independent of temperature. Still additionally, or alternatively, the received signal may be calibrated based on known signals received at the well such as a known formation signal received at a known depth.

The formation signals may also be normalized. By normalization, the formation signals may be adjusted to a common scale. The formation signals may be represented as a voltage/current output by the receiver. The formation signals may be normalized using an output of the sense coil on the transmitter. In one example, the voltage of a formation signal may be normalized using a voltage of the sense coil indicative of the electromagnetic field produced at the transmitter which produced the formation signal. For example, the formation signal measured at a time instant may be divided by a corresponding sense voltage to calculate a normalized formation signal. The corresponding sense voltage may be the sense voltage at that same time instant or the sense voltage measured at an earlier time to account for a delay between when the transmitter input signal is applied and formation signal corresponding to the transmit input signal is measured. The normalization may account for the losses and non-linear behavior of the transmitter core that are included in the electromagnetic field measured at the transmitter. In another example, the current of the formation signal may be normalized using the current of the sense coil indicative of the electromagnetic field produced at the transmitter. For example, the formation signal measured at a time instant may be divided by a corresponding sense current to calculate a normalized formation signal. The normalization may account for the losses and non-linear behavior of the transmitter core that are included in the electromagnetic field measured at the transmitter.

When the losses and non-linear behavior of the transmitter core that are included in the current measured at the transmitter is negligible, the current applied to the transmitter coil may be used for normalization. For example, current may be used to normalize a voltage output by the receiver. The formation signal measured at a time instant may be divided by a corresponding current to calculate a normalized formation signal.

In this regard, one or more of the transmit input signal, output of the sense coil when the transmit input signal is applied, and the formation signal may be associated together for processing. A time series of these signals may be stored in the data processing unit so that corresponding samples can be located in time and processed. The formation signals received by the receiver may be indicative of the IP effect, e.g., the formation response. A comparison of a phase of the transmit input signal or transmit output signal with the phase of the voltage associated with the formation signal received by the receiver at a time instance may be indicative of the complex resistivity of the formation. A larger difference in phase may indicate a larger imaginary component of the complex resistivity while a smaller difference in phase may indicate a smaller imaginary component of the complex resistivity. In turn, the complex resistivity may be indicative of the fluid saturation of the formation.

Processing the formation signals to determine the complex resistivity can include an inversion process.

Figure 6:
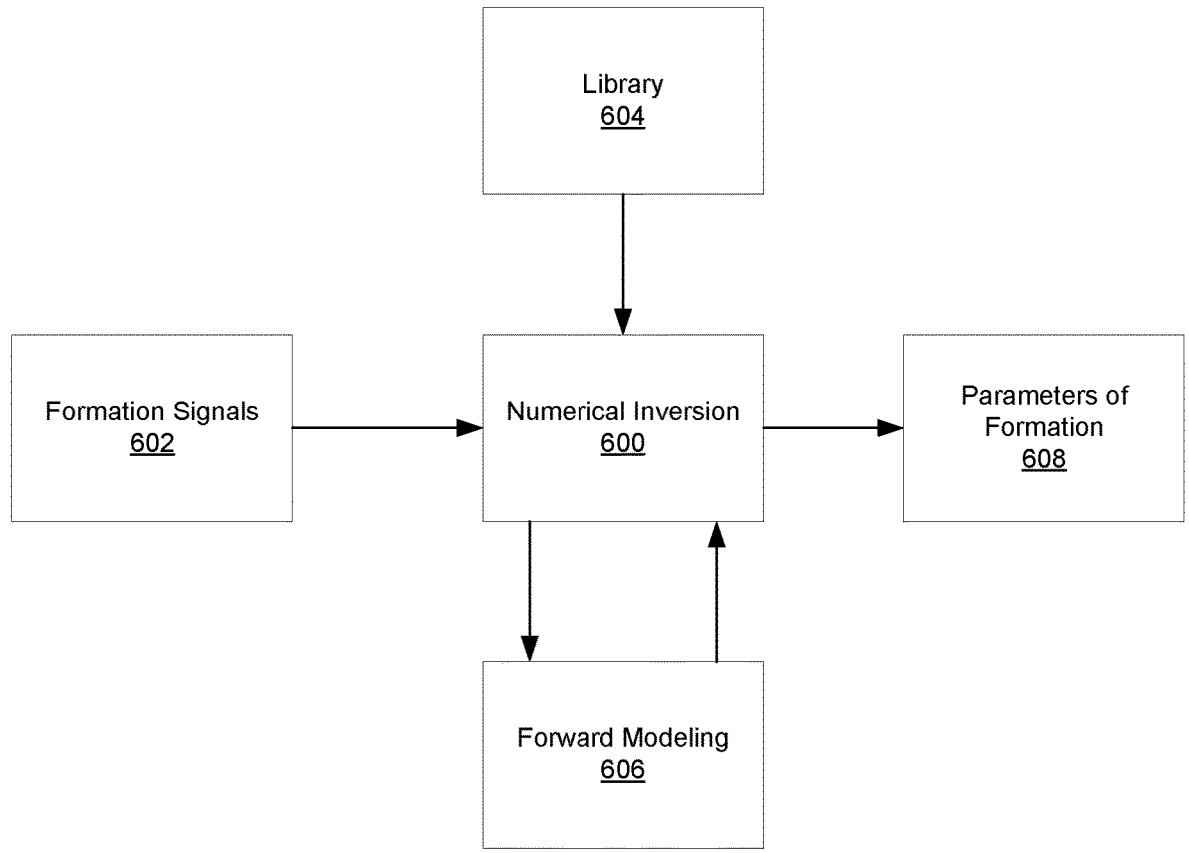
FIG. 6 shows an example inversion method associated with the example process for determining formation characteristics.

FIG. 6 shows an example of this inversion process 600. Inversion operations can include a comparison of measurements to predictions of a model such that a value or spatial variation of a physical property can be determined.

A conventional inversion operation can include determining the complex resistivity of the formation from the processed formation signals. The inversion process may include comparing the processed formation signals 602 to signals in a library 604 associated with formation parameters such as complex resistivity. A closest match may indicate the complex resistivity 608 of the formation associated with the formation signals. The matching may be based on various schemes such as least squares fitting, and/or pattern matching. Additionally, or alternatively, a forward model may be used. The forward model may calculate expected observed values with respect to an assumed formation model. Forward modeling 606 may involve determining what a given receiver would measure in a given formation by solving a set of equations that parameterize the earth model parameters, and simulate the electromagnetic field propagation through the formation for the given source and receiver geometries and frequencies, and may be inclusive of environmental effects such as borehole effects and tool eccentricity within the borehole. The processed formation signals may be compared to an output of the forward model and a difference is used to adjust the earth model parameters. Then, an output of the forward model then compared again to the processed formation signals. This process is repeated until the output of forward model closely match the formation signals, or some other termination criteria such as the inversion exceeding a maximum number of iterations. The final forward model is an estimate of the formation parameters, e.g., complex resistivity 608 of the formation.

Effects due to the presence of tool housing and coupling between transmitters and receivers in the formation signals can be corrected by using a priori information about these structures, or by solving for some or all of them during the inversion process. Since these effects are mainly additive, i.e., they are known and can be subtracted out from the formation signals. Additionally, in a separate inversion or part of the inversion for determining the complex resistivity, a determination may be made as to the fluid saturation of the formation. The fluid saturation may be based on the complex resistivity of the formation.

Figure 7:
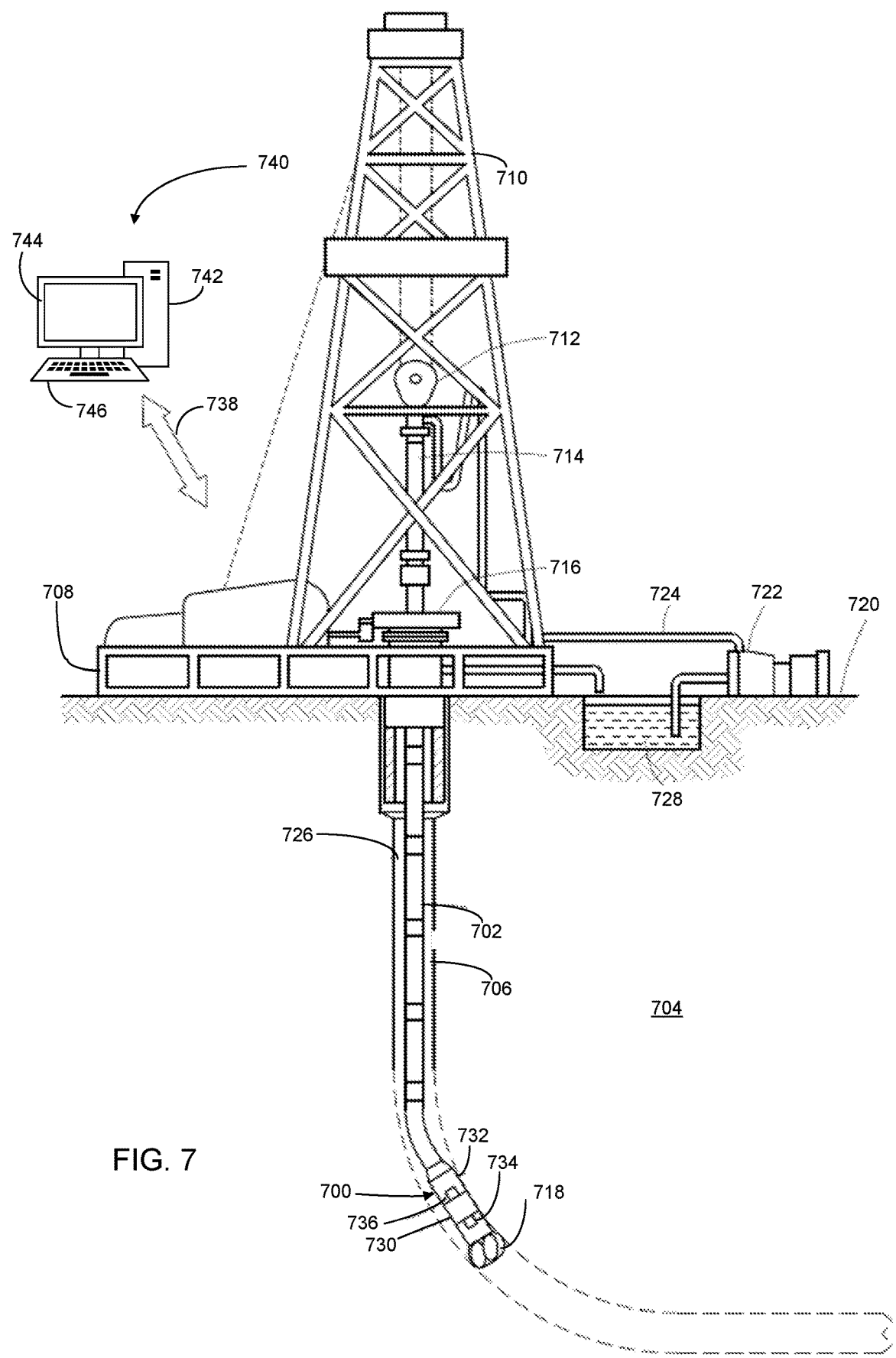
FIG. 7 is a schematic diagram of an example wellbore analysis system on a drill string in accordance with one or more embodiments.

FIG. 7 is a schematic diagram of an example wellbore analysis system on a drill string that can be used to perform some of the operations and functions described with reference to FIGS. 1-6. The apparatus includes a logging tool 700 disposed on a drill string 702 of a depicted well apparatus. Logging tool 700 may be used to obtain complex resistivity data from a subterranean formation 704. While wellbore 706 is shown extending generally vertically into the subterranean formation 704, the principles described herein are also applicable to wellbores that extend at an angle through the subterranean formation 704, such as horizontal and slanted wellbores. For example, although FIG. 7 shows a vertical or low inclination angle well, high inclination angle or horizontal placement of the well and equipment is also possible. It should further be noted that while FIG. 7 generally depicts a land-based operation, those skilled in the art will readily recognize that the principles described herein are equally applicable to subsea operations that employ floating or sea-based platforms and rigs, without departing from the scope of the disclosure.

The well apparatus further includes a drilling platform 708 that supports a derrick 710 having a traveling block 712 for raising and lowering drill string 702. Drill string 702 may include, but is not limited to, drill pipe and coiled tubing, as generally known to those skilled in the art. A kelly 714 may support drill string 702 as it may be lowered through a rotary table 716. A drill bit 718 may be attached to the distal end of drill string 702 and may be driven either by a downhole motor and/or via rotation of drill string 702 from the surface 720. Without limitation, drill bit 718 may include, roller cone bits, PDC bits, natural diamond bits, any hole openers, reamers, coring bits, and the like. As drill bit 718 rotates, it may create and extend wellbore 706 that penetrates various subterranean formations such as 704. A pump 722 may circulate drilling fluid through a feed pipe 724 to kelly 714, downhole through interior of drill string 702, through orifices in drill bit 718, back to surface 720 via annulus 726 surrounding drill string 702, and into a retention pit 728.

Drill bit 718 may be just one piece of a downhole assembly that may include one or more drill collars 730. One or more of drill collars 730 may form a tool body 732. Tool body 732 may be any suitable material, including without limitation titanium, stainless steel, alloys, plastic, combinations thereof, and the like. Logging tool 700 may further include one or more sensors such the receiver 734 and transmitter 736 for measuring complex resistivity of the subterranean formation 704.

Any suitable technique may be used for transmitting signals, e.g., formation responses, from logging tool 700 to a computing system residing on the surface 720. As illustrated, a communication link 738 (which may be wired or wireless, for example) may be provided that may transmit data from logging tool 700 to an information handling system 740 at the surface 720. Communication link 738 may implement one or more of various known drilling telemetry techniques such as mud-pulse, acoustic, electromagnetic, etc. Information handling system 740 may include a processing unit 742, a monitor 744, an input device 746 (e.g., keyboard, mouse, etc.), and/or computer media (e.g., optical disks, magnetic disks) that can store code representative of the methods described herein. Information handling system 740 may act as a data acquisition system and possibly a data processing system that analyzes information from logging tool 700. For example, information handling system 740 may process the information from logging tool 700 for determination of the formation parameters.

Figure 8:
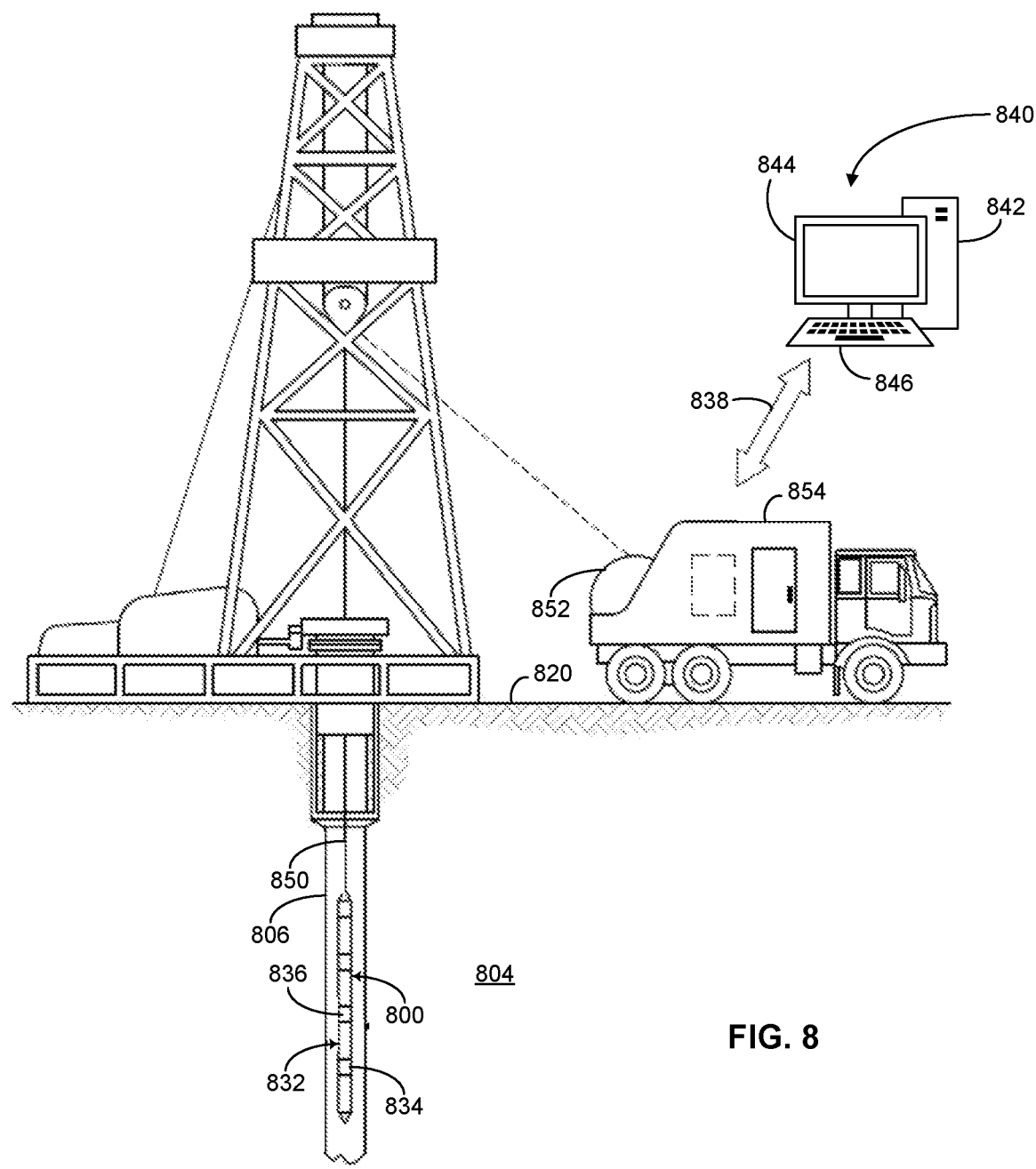
FIG. 8 is a schematic diagram of an example downhole logging tool on a wireline in accordance with one or more embodiments.
Figure 9:
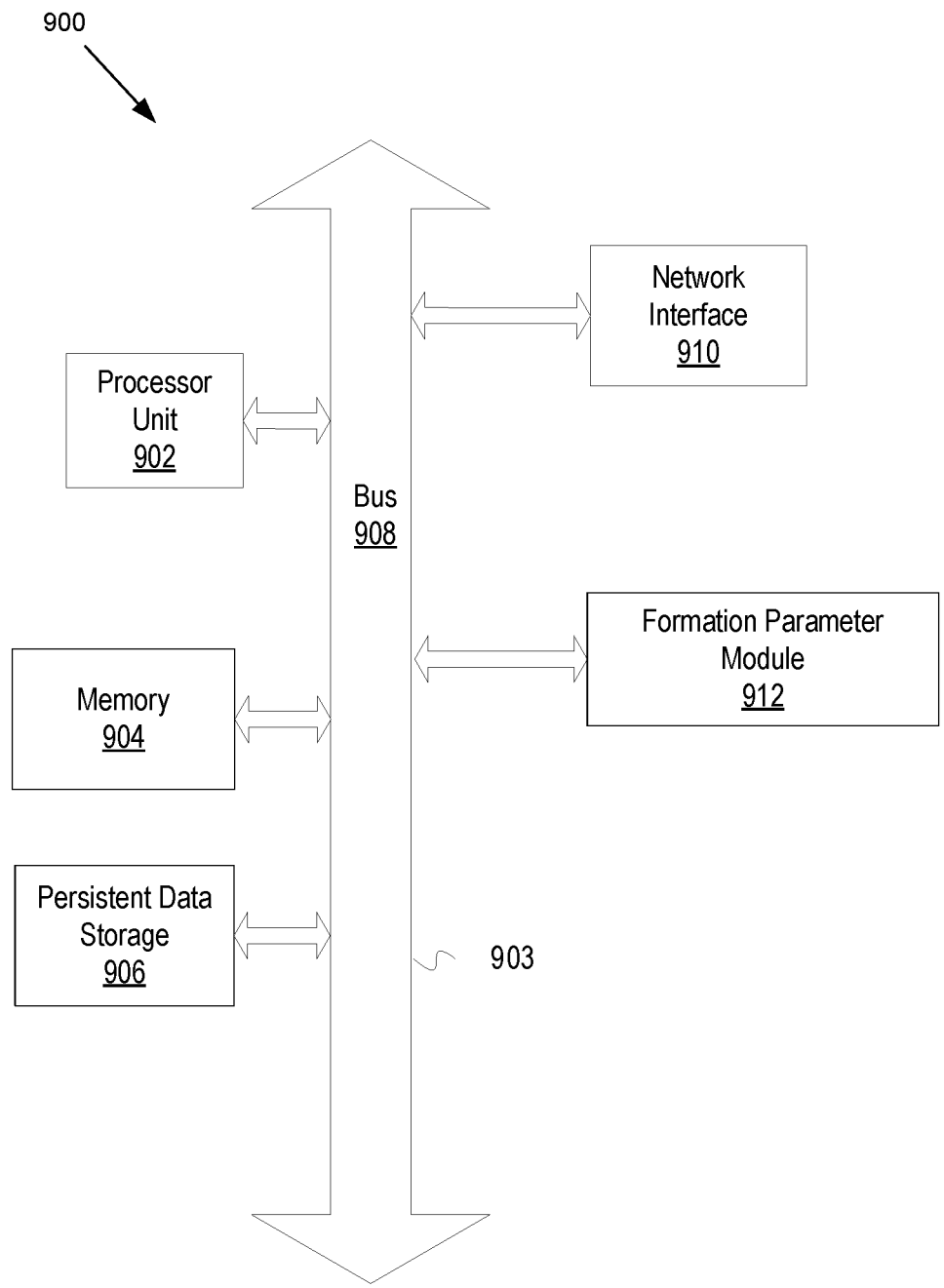
FIG. 9 shows an example computer system, according to some embodiments.

Referring now to FIG. 8, a schematic diagram is shown of an example logging tool 800 on a wireline 850 that can be used to perform some of the operations and functions described with reference to FIGS. 1-6. As illustrated, a wellbore 806 may extend through subterranean formation 804. Logging tool 800 may be similar in configuration and operation to logging tool 700 shown on FIG. 7 except that FIG. 8 shows logging tool 800 disposed on wireline 850. It should be noted that while FIG. 8 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 852 may be used to run logging tool 800 into wellbore 806. Hoist 852 may be disposed on a recovery vehicle 854. Hoist 852 may be used, for example, to raise and lower wireline 850 in wellbore 806. While hoist 852 is shown on recovery vehicle 854, it should be understood that wireline 850 may alternatively be disposed from a hoist 852 that is installed at surface 820 instead of being located on recovery vehicle 854. Logging tool 800 may be suspended in wellbore 806 on wireline 850. Other conveyance types may be used for conveying logging tool 800 into wellbore 806, including coiled tubing, wired drill pipe, slickline, and downhole tractor, for example. Logging tool 800 may comprise a tool body 832, which may be elongated as shown on FIG. 8. Tool body 832 may be any suitable material, including without limitation titanium, stainless steel, alloys, plastic, combinations thereof, and the like. Logging tool 800 may further include one or more sensors 834 such the receiver and transmitter 836 for measuring complex resistivity of the subterranean formation 804.

As illustrated, a hoist 852 may be used to run logging tool 800 into wellbore 806. Hoist 852 may be disposed on a recovery vehicle 854. Hoist 852 may be used, for example, to raise and lower wireline 850 in wellbore 806. While hoist 852 is shown on recovery vehicle 854, it should be understood that wireline 850 may alternatively be disposed from a hoist 852 that is installed at surface 820 instead of being located on recovery vehicle 854. Logging tool 800 may be suspended in wellbore 806 on wireline 850. Other conveyance types may be used for conveying logging tool 800 into wellbore 806, including coiled tubing, wired drill pipe, slickline, and downhole tractor, for example. Logging tool 800 may comprise a tool body 832, which may be elongated as shown on FIG. 8. Tool body 832 may be any suitable material, including without limitation titanium, stainless steel, alloys, plastic, combinations thereof, and the like. Logging tool 800 may further include one or more sensors 834 such the receiver and transmitter 836 for measuring complex resistivity of the subterranean formation 804.

As previously described, information from logging tool 800 may be transmitted to an information handling system 840, which may be located at surface 820. As illustrated, communication link 838 (which may be wired or wireless, for example) may be provided that may transmit data, e.g., formation responses from logging tool 800, to an information handling system 840 at surface 820. Information handling system 840 may include a processing unit 842, a monitor 844, an input device 846 (e.g., keyboard, mouse, etc.), and/or computer media 848 (e.g., optical disks, magnetic disks) that can store code representative of the methods described herein. Alternatively, the processing may occur at surface 820 or another location after withdrawal of logging tool 800 from wellbore 806. Still alternatively, the processing may be performed by an information handling system in wellbore 806, such as analysis module 836. The resultant complex resistivity and/or fluid saturation of the formation may then be transmitted to surface 820, for example, in real-time to an analytics client running on information handling system 840.

The computer system 900 includes a processor 902 (possibly including multiple processors, multiple cores, multiple nodes, and/or implementing multi-threading, etc.). The computer device includes memory 904. The memory 904 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a persistent data storage 906. The persistent data storage 906 can be a hard disk drive, such as magnetic storage device. The computer device also includes a bus 908 (e.g., PCI, ISA, PCI-Express etc.) and an interface 910 in communication with the tool for measuring a formation response. The computer may have a formation parameter module 912 to determine formation parameters such as complex resistivity based on the formation response determined based on the tool. A formation signal from a transmitter-receiver pair may be communicated to the computer system. In some examples, one or more of the sense signal from a sense coil of a transmitter, transmit input signal applied to a transmitter coil of the transmitter, and transmit output signal of a transmitter corresponding to the formation signal may also be communicated to the computer system. The computer system may perform an inversion process for determining the complex resistivity of the formation based on these signals. The complex resistivity of the formation may also be used to identify fluid saturation in the formation and determine subsequent action to be taken in a drilling operation. For example, drilling may be steered to those areas with higher fluid saturation indicative of presence of hydrocarbons using any one of various suitable directional drilling systems, including steering vanes, a "bent sub", and a rotary steerable system. The complex resistivity may be used in other ways as well.

The computer system also includes a persistent data storage 906. The persistent data storage 906 can be a hard disk drive, such as magnetic storage device. The computer device also includes a bus 908 (e.g., PCI, ISA, PCI-Express etc.) and an interface 910 in communication with the tool for measuring a formation response. The computer may have a formation parameter module 912 to determine formation parameters such as complex resistivity based on the formation response determined based on the tool. A formation signal from a transmitter-receiver pair may be communicated to the computer system. In some examples, one or more of the sense signals from a sense coil of a transmitter, transmit input signal applied to a transmitter coil of the transmitter, and transmit output signal of a transmitter corresponding to the formation signal may also be communicated to the computer system. The computer system may perform an inversion process for determining the complex resistivity of the formation based on these signals. The complex resistivity of the formation may also be used to identify fluid saturation in the formation and determine subsequent action to be taken in a drilling operation. For example, drilling may be steered to those areas with higher fluid saturation indicative of presence of hydrocarbons using any one of various suitable directional drilling systems, including steering vanes, a "bent sub", and a rotary steerable system. The complex resistivity may be used in other ways as well.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any non-transitory tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for real-time monitoring and control of perforation plug deployment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Additional embodiments can include varying combinations of features or elements from the example embodiments described above. For example, one embodiment may include elements from three of the example embodiments while another embodiment includes elements from five of the example embodiments described above.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

Embodiment 1: A method comprising: positioning a logging tool having a transmitter and receiver downhole in a geological formation; while the logging tool is static, applying a transmit input signal to the transmitter to cause the transmitter to output a transmit output signal into the formation, wherein the transmit output signal is an electromagnetic field; while the logging tool is static, receiving from the receiver a formation signal, wherein formation signal is based on canceling the transmit output signal from a signal received by the receiver, the formation signal being a voltage indicative of an induced polarization in the formation based on the transmit output signal; and determining a complex resistivity of the formation based on the formation signal.

Embodiment 2: The method of claim 1, wherein the transmit input signal comprises one or more sinusoidal voltages or sinusoidal currents with frequencies in a range of 0.5 Hertz (Hz) to 100 Hz to induce the polarization in the formation.

Embodiment 3: The method of Embodiment 1 or 2, wherein applying the transmit signal comprises applying a transmit input signal to a transmit coil of the transmitter, wherein the transmit coil is formed around a magnetic core; and wherein receiving the formation signal comprises receiving, via a main and bucking coil of the receiver, the formation signal, wherein the main and bucking coil cancel the transmit output signal to output the formation signal.

Embodiment 4: The method of any of Embodiments 1-3, wherein the transmitter comprises a sense coil for measuring the electromagnetic field associated with the transmit output signal, the method further comprising normalizing the formation signal based on the measurement by the sense coil.

Embodiment 5: The method of any of Embodiments 1-4, further comprising normalizing the formation signal based on the transmit input signal.

Embodiment 6: The method of any of Embodiments 1-5, wherein determining the complex resistivity comprises inverting the formation signal to determine the complex resistivity of the formation and derive formation properties including fluid saturation.

Embodiment 7: The method of any of Embodiments 1-6, wherein receiving the formation signal comprises receiving the formation signal via a main coil of the receiver having greater than 10,000 turns of a conductive wire around a non-magnetic core of the main coil.

Embodiment 8: The method of any of Embodiments 1-7, further comprising moving the transmitter and receiver to another depth in the formation; applying the transmit input signal to the transmitter; receiving another formation signal; and inverting the formation signal and the other formation signal to determine the complex resistivity.

Embodiment 9: The method of any of Embodiments 1-8, further comprising selecting the transmitter and receiver based on a resolution of the complex resistivity to be determined.

Embodiment 10: Apparatus comprising: a transmitter arranged with a transmit coil formed around a magnetic core, wherein while the transmitter is static a transmit input signal is applied to the transmit coil of the transmitter to cause the transmitter to output a transmit output signal into a formation; wherein the transmitter is static when the transmitter outputs the transmit output signal; and wherein the transmit output signal is an electromagnetic field; and a receiver arranged with a main and bucking coil, wherein the main and bucking coil are formed around a non-magnetic core, wherein the main and bucking coil are arranged to cancel the transmit output signal from a signal received by the receiver to output a formation signal while the receiver is static; and wherein the formation signal is a voltage indicative of an induced polarization in the formation based on the electromagnetic field and complex resistivity of the formation.

Embodiment 11: The apparatus of Embodiment 10, wherein the transmit input signal comprises one or more sinusoidal currents or sinusoidal voltages with frequencies in a range of 0.5 Hertz (Hz) to 100 Hz to induce the polarization in the formation.

Embodiment 12: The apparatus of Embodiment 10 or 11, wherein the transmitter and receiver are separated by a distance of 50 cm to 20 meters.

Embodiment 13: The apparatus of any of Embodiments 10-12, wherein the transmitter comprises a sense coil to measure the electromagnetic field associated with the transmitter to facilitate normalizing the formation signal based on the measurement by the sense coil.

Embodiment 14: The apparatus of any of Embodiments 10-13, wherein the main coil comprises greater than 10,000 turns of a conductive wire around the non-magnetic core to detect the formation signal.

Embodiment 15: The apparatus of any of Embodiments 10-14, wherein the complex resistivity is based on comparing a phase of the transmit output signal and formation signal.

Embodiment 16: A system comprising: a downhole tool to be positioned in a wellbore of a formation, the downhole tool having a transmitter and a receiver, wherein, while the transmitter and the receiver are static, the transmitter is to output a transmit output signal into the formation and the receiver is to receive a formation signal based on the transmit output signal, wherein formation signal is based on canceling the transmit output signal from a signal received by the receiver; and wherein the formation signal is a voltage indicative of an induced polarization in the formation; a processor; and a machine-readable medium having program code executable by the processor to cause the processor to determine the complex resistivity of the formation based on the formation signal.

Embodiment 17: The system of Embodiment 16, wherein the transmitter comprises a sense coil to measure the electromagnetic field associated with the transmit output signal, the computing system further comprising computer instructions for normalizing the formation signal based on the measurement by the sense coil.

Embodiment 18: The system of Embodiment 16 or 17, wherein a transmit input signal comprises one or more sinusoidal currents or sinusoidal voltages with frequencies in a range of 0.5 Hertz (Hz) to 100 Hz to induce the polarization in the formation.

Embodiment 19: The system of any of Embodiments 16-18, wherein a main coil comprises greater than 10,000 turns of a conductive wire around a non-magnetic core to detect the formation signal.

Embodiment 20: The system of any of Embodiments 16-19, wherein the transmitter is arranged with a transmit coil formed around a magnetic core; wherein the receiver is arranged with a main and bucking coil; wherein the main and bucking coil are formed around a non-magnetic core.

What is claimed is:

1. A method comprising:
    positioning a logging tool having a transmitter and receiver downhole in a geological formation;
    while the logging tool is static, applying a transmit input signal to the transmitter to cause the transmitter to output a transmit output signal into the geological formation,
        wherein the transmit output signal is an electromagnetic field;
    while the logging tool is static, receiving from the receiver a formation signal, wherein formation signal is based on canceling the transmit output signal from a signal received by the receiver, the formation signal being a voltage indicative of an induced polarization in the geological formation based on the transmit output signal; and
    determining a complex resistivity of the geological formation based on the formation signal.

2. The method of claim 1, wherein the transmit input signal comprises one or more sinusoidal voltages or sinusoidal currents with frequencies in a range of 0.5 Hertz (Hz) to 100 Hz to induce the polarization in the geological formation.

3. The method of claim 1,
    wherein applying the transmit input signal comprises applying the transmit input signal to a transmit coil of the transmitter, wherein the transmit coil is formed around a magnetic core; and
    wherein receiving the formation signal comprises receiving, via a main and bucking coil of the receiver, the formation signal, wherein the main and bucking coil are formed around a non-magnetic core, and wherein the main and bucking coil cancel the transmit output signal to output the formation signal.

4. The method of claim 1, wherein the transmitter comprises a sense coil for measuring the electromagnetic field associated with the transmit output signal, the method further comprising normalizing the formation signal based on the measurement by the sense coil.

5. The method of claim 1, further comprising normalizing the formation signal based on the transmit input signal.

6. The method of claim 1, wherein determining the complex resistivity comprises inverting the formation signal to determine the complex resistivity of the geological formation and derive formation properties including fluid saturation.

7. The method of claim 1, wherein receiving the formation signal comprises receiving the formation signal via a main coil of the receiver having greater than 10,000 turns of a conductive wire around a non-magnetic core of the main coil.

8. The method of claim 1, further comprising moving the transmitter and the receiver to another depth in the geological formation; applying the transmit input signal to the transmitter; receiving another formation signal; and inverting the formation signal and the other formation signal to determine the complex resistivity.

9. The method of claim 1, further comprising selecting the transmitter and the receiver based on a resolution of the complex resistivity to be determined.

10. An apparatus comprising:
a transmitter arranged with a transmit coil formed around a magnetic core, wherein, while the transmitter is static, a transmit input signal is applied to the transmit coil of the transmitter to cause the transmitter to output a transmit output signal into a formation; wherein the transmit output signal is an electromagnetic field; and
a receiver arranged with a main and bucking coil, wherein the main and bucking coil are formed around a non-magnetic core, wherein the main and bucking coil are arranged to cancel the transmit output signal from a signal received by the receiver to output a formation signal while the receiver is static; and wherein the formation signal is a voltage indicative of an induced polarization in the formation based on the electromagnetic field and complex resistivity of the formation.

11. The apparatus of claim 10, wherein the transmit input signal comprises one or more sinusoidal currents or sinusoidal voltages with frequencies in a range of 0.5 Hertz (Hz) to 100 Hz to induce the polarization in the formation.

12. The apparatus of claim 11, wherein the transmitter and the receiver are separated by a distance of 50 cm to 20 meters.

13. The apparatus of claim 10, wherein the transmitter comprises a sense coil to measure electromagnetic induction associated with the transmitter to facilitate normalizing the formation signal based on the measurement by the sense coil.

14. The apparatus of claim 10, wherein the main coil comprises greater than 10,000 turns of a conductive wire around the non-magnetic core to detect the formation signal.

15. The apparatus of claim 10, wherein the complex resistivity is based on comparing a phase of the transmit output signal and the formation signal.

16. A system comprising:
a downhole tool to be positioned in a wellbore of a formation, the downhole tool having a transmitter and a receiver, wherein, while the transmitter and the receiver are static, the transmitter is to output a transmit output signal into the formation and the receiver is to receive a formation signal based on the transmit output signal, wherein formation signal is based on canceling the transmit output signal from a signal received by the receiver; and wherein the formation signal is a voltage indicative of an induced polarization in the formation;
a processor; and
a machine-readable medium having program code executable by the processor to cause the processor to determine a complex resistivity of the formation based on the formation signal.

17. The system of claim 16, wherein the transmitter comprises a sense coil to measure an electromagnetic field associated with the transmit output signal, the system further comprising computer instructions for normalizing the formation signal based on the measurement by the sense coil.

18. The system of claim 16, wherein a transmit input signal comprises one or more sinusoidal currents or sinusoidal voltages with frequencies in a range of 0.5 Hertz (Hz) to 100 Hz to induce the polarization in the formation.

19. The system of claim 16, wherein a main coil comprises greater than 10,000 turns of a conductive wire around a non-magnetic core to detect the formation signal.

20. The system of claim 16, wherein the transmitter is arranged with a transmit coil formed around a magnetic core; wherein the receiver is arranged with a main and bucking coil; wherein the main and bucking coil are formed around a non-magnetic core.

* * * * *